US008881288B1

(12) United States Patent
Levy et al.

(10) Patent No.: US 8,881,288 B1
(45) Date of Patent: Nov. 4, 2014

(54) GRAPHICAL MODELS FOR CYBER SECURITY ANALYSIS IN ENTERPRISE NETWORKS

(75) Inventors: Renato Levy, North Potomac, MD (US); Hongjun Li, Potomac, MD (US); Peng Liu, State College, PA (US); Margaret Lyell, Bethesda, MD (US)

(73) Assignee: Intelligent Automation, Inc., Rockville, MD (US)

( * ) Notice: Subject to any disclaimer, the term of this patent is extended or adjusted under 35 U.S.C. 154(b) by 884 days.

(21) Appl. No.: 12/589,738

(22) Filed: Oct. 28, 2009

Related U.S. Application Data (60) Provisional application No. 61/108,883, filed on Oct. 28, 2008.

(51) Int. Cl.
  *G06F 21/00* (2013.01)
  *G06F 21/57* (2013.01)
  *H04L 29/06* (2006.01)

(52) U.S. Cl.
  CPC .......... *G06F 21/577* (2013.01); *H04L 63/1408* (2013.01)
  USPC ........................................... 726/25; 709/225

(58) Field of Classification Search
  CPC ... G06F 21/577; G06F 21/36; H04L 63/1433; H04L 63/1416; H04L 63/20; H04L 63/1408
  USPC ......................................................... 726/25
  See application file for complete search history.

(56) References Cited

U.S. PATENT DOCUMENTS

| | | | |
|---|---|---|---|
| 6,907,430 B2 * | 6/2005 | Chong et al. ........................ 1/1 |
| 6,952,779 B1 | 10/2005 | Cohen et al. | |
| 7,013,395 B1 * | 3/2006 | Swiler et al. ................... 726/25 |
| 7,735,141 B1 * | 6/2010 | Noel et al. ...................... 726/25 |

OTHER PUBLICATIONS

Li, Jason H., Renato Levy, and Peng Liu. "Intelligent Cyber Security Analysis in Enterprise Networks." Association for the Advancement of Artifical Intelligence. Proceedings of 2007 AAAI RIDIS Workshop (pp. 75-78).*

(Continued)

*Primary Examiner* — Kambiz Zand
*Assistant Examiner* — Narciso Victoria
(74) *Attorney, Agent, or Firm* — Faegre Baker Daniels LLP (57) ABSTRACT

A method of generating graphical models for providing security analysis in computer networks that in one embodiment includes the steps of generating a type abstract graph independent of particular networks that models abstract dependency relationships among attributes and exploits; generating network-specific attack graphs by combining the type abstract graph with specific network information; monitoring an intruder alert; and generating a real-time attack graph by correlating the intruder alert with the network-specific attack graph. The real-time attack graph can be generated using reachability checking, bridging, and exploit prediction based on consequence alerts and may further include the step of calculating the likelihood of queries using a Bayesian network model. The method may also include the steps of inferring unobserved attacks that may have been missed by intrusion detection sensors, and projecting on which hosts and using what exploits additional intruder attacks may occur. The method may further include the step of comparing alternate actions by computation, wherein the alternate actions include the step of patching some vulnerabilities, and wherein the specific network information includes network topology. The specific network information may also include firewall rules.

44 Claims, 4 Drawing Sheets

(56) References Cited

OTHER PUBLICATIONS

Noel, Steven, Eric Robertson, and Sushil Jajodia. "Correlating Intrusion Events and Building Attack Scenarios through Attack Graph Distances." $20^{th}$ Annual Computer Security Applications Conference, 2004, pp. 350-359.*

T. Tidwell, R. Larson, K. Fitch, and J. Hale. Modeling Internet attacks. In Proceedings of the 2001 IEEE Workshop on Information Assurance and Security, West Point, NY, et al.

R. Levy, P. Carlos, and A. Teittinen, Mobile Agent Routing-A Survivable Ad-Hoc Routing Protocol, in Proc. MILCOM 2005.

G. F. Cooper "Computational Complexity of Probabilistic Inference using Bayesian Belief Networks(research notes)," Artificial Intelligence, vol. 42, pp. 393-405, 1990.

J. H. Li, "Intelligent Distributed Fault and Performance Management for Communication Networks", Ph.D. Thesis, University of Maryland, 2001.

R. P. Lippmann, K. W. Ingols, "An Annotated Review of Past Papers on Attach Graphs", MIT Lincolhn Lab Technical Report, ESC-TR-2005-054, 2005.

P. Ning and D. Xu, "Learning Attach Strategies from Intrusion Alerts", ACM CCS 2003.

X. Ou, W. F. Boyer, M. Mcqueen, "A Scalable Approach to Attack Graph Generation", Proc. 13th ACM Conference on Computer and Communication Security (CCS), 2006, pp. 336-345.

J. Pearl, "Probabilistic Reasoning in Intelligent Systems: Networks of Plausible Inference", Morgan Kaufman, 1999.

J. Pearl, "Causality: Models, Reasoning, and Inference", Cambridge Press, 2000.

C. Phillips and L. P. Swiler. "A Graph-Based System for Network-Vulnerability Analysis", In NSPW '98: Proceedings of the 1998 workshop on New security paradigms, pp. 71-79.

G. Shafer, "Probablistic Expert Systems", Society for Industrial and Applied Mathematics, 1996.

O. Sheyner, J. Haines, S. Jha, R. Lippmann, and J. M. Wing. "Automated Generation and Analysis of Attack Graphs", In proceedings of the 2002 IEEE Symposium on Security et al.

* cited by examiner

GRAPHICAL MODELS FOR CYBER SECURITY ANALYSIS IN ENTERPRISE NETWORKS

This application claims the benefit of U.S. Provisional Patent Application Ser. No. 61/108,883 filed Oct. 28, 2008, the complete disclosure of which is hereby expressly incorporated by reference.

This invention was made with government support under Contract No. W911NF-07-C-0101, awarded by the U.S. Army Research Office, and Contract Nos. FA8750-07-C-0090 and FA8750-08-C-0137, awarded by the U.S. Air Force Research Laboratory. The government has certain rights in the invention.

BACKGROUND OF THE INVENTION

This invention relates to the design of graphical models for cyber security, and in particular, to a separation and integration approach of graphical models to protect enterprise networks against intruder attacks.

In enterprise networks, the critical importance of network security and information assurance is a major concern. An enterprise network is a network for a large business or enterprise. It may comprise a number of local area networks that have to interface with each other as well as database management systems and many client workstations. The design and management of enterprise networks can be very complex and may include several different types of networks and computer systems from different vendors.

In particular, for network-centric warfare, in order to ensure mission success, the network-centric enterprise needs to have the capability to provide real-time situational awareness and decision assistance so that the information services are reliable, secure, available, and correct. However, it is believed that technology currently available is incapable of achieving such goals.

Generally, securing networks and systems entails three steps: prevention, detection, and action. Many research efforts and products have addressed problems related to prevention (e.g., firewalls) and detection (e.g., Intrusion Detection Systems (IDS)), and the strategies of "compartmentalization" and "defend-in-depth" have been deployed in enterprise networks. However, there is a lack of "action" related systems to effectively deal with enterprise network intrusion.

Products currently available may provide a significant benefit; however, the filters and network/host monitors that are available block traffic and report misbehavior based largely on rules, signatures, and not a situational analysis. For example, with current Intrusion Detection Systems, low-level alarms will be issued, but no high-level situation awareness is provided. Furthermore, although there is some development related to alarm correlation, this focuses mostly on local events in which it is up to the operator to correlate events in the entire network/system level, to evaluate the current network situation, to assess the cyber attack damage, and to maintain the support of various applications and missions. However, the complexity and dynamic nature of the networks and systems that comprise the information enterprise can make it difficult for operators to interpret and manage. Therefore, during cyber attacks, human operators can be inundated by a large number of alarms without being able to correlate, understand, evaluate, or act upon them. Even under normal operations, the operators need to understand the current status of the networks and systems in order to support missions, analyze security risks, and plan for security countermeasures. With the complexity of enterprise networks, this alone is a daunting task even without the need to react to alarms.

The prior art of detecting attacks merely transforms raw data to information (such as alarm). Current systems for transforming information to intelligence (i.e., situational awareness and action planning) are significantly lacking, and useful software tools for such purposes are not currently available.

In general, current attack graphs model cyber-attacks networks and systems, and the questions that can be answered are related to network and system-specific aspects (e.g., host, systems, vulnerabilities and exploits, etc.). Such graphs cannot execute application and mission-level damage assessment. Furthermore, the dependency of applications and missions on underlying networks and systems can naturally be modeled using graphs where the edges represent the "depends-on" relationship. Such dependency graphs have been proposed in literature to analyze applications (e.g., database) and operating system intrusion recovery. However, such models are insufficient to render network-specific security analysis due to their simplistic semantics and limited scalability. In order to provide a full picture for network security assessment, a unified approach is required that can execute both the network-level security analysis and the high-level application and mission assessment.

In order to support security management tasks in enterprise networks (with potentially thousands of devices), the graphic models need to be scalable. This is particularly critical for attack graphs since they need to handle the systems and network devices. Thus, one of the biggest impediments to achieving scalability is state explosion. As such, most available prior art only supports static analysis to answer questions, such as, "Given the current network configurations, which are the weakest spots that need immediate attention?" While static analysis is useful, it is not sufficient if the goal is to achieve real-time situational awareness and responsive action planning.

Attack graphs that provide poor scalability, inefficient analysis, and that require various manual efforts are impractical; however, various kinds of attack graphs have been proposed for analyzing network security. It should be noted that the term "attack graph" is commonly used; however, the definition of an attack graph is not uniform and different uses may associate unique semantics with nodes (endpoints of graphical elements) and edges in models.

One prior art attack graph is described in a publication by Carnegie Mellon University professors. In the Carnegie Mellon attack graph, nodes represent the network state and attributes, such as hosts and services, and the edges represent specific exploits. Each path in the attack graph describes a specific series of attack instances leading to an attack (e.g., gaining root access of some host). The Carnegie Mellon attack graph is rich in semantics, since essentially, it is capable of modeling all aspects of a network state, security attributes, and attack methods. As a result, the scalability of this attack graph is extremely poor, as the possible number of states is exponential. The poor scalability makes overall analysis capability unfeasible except for very small networks. This inhibits the practical use, and due to the scalability problems, tremendous manual efforts are required.

Another prior art attack graph has been developed at George Mason University. The George Mason attack graph aimed to reduce the size of the resulting attack graph by using a layered organization of the attributes and employing an efficient search algorithm. The key assumption in the George Mason attack graph is "monotonic attack," that is, privileges obtained at prior stages will stay and not be eliminated in subsequent actions. The George Mason attack graph is significantly reduced compared to the Carnegie Mellon attack graph, yet the George Mason attack graph encodes a significant portion of or almost all of the Carnegie Mellon attack graph semantics. However, the scalability of the George Mason attack graph is still less than would be desired for large networks. A computation grows as $N^6$, where N is a number of hosts. Similar to the Carnegie Mellon attack graph, it is believed that this kind of attack graph is not practical for enterprise networks, unless further reduction of the graph size is achieved.

Another attack graph has been developed at Kansas State University. The semantics of the Kansas State attack graph is different from the George Mason and Carnegie Mellon attack graphs. Essentially, nodes represent a lot and edges represent a little. This is in accordance with the rationale based on a reasoning system called MulVAL (also developed by the same authors) for automatically identifying security vulnerabilities in enterprise networks. The key idea is that most configuration information can be represented as Datalog (a syntactic subset of Prolog) tuples (a set of values passed from one programming language to another application program or to a system program such as an operating system), and most attack techniques can be specified using Datalog rules. The logical attack graph can thus be viewed as a derivation graph for successful Datalog logic analysis. The worst case computation complexity grows between $O(N^2)$ and $O(N^3)$, which is heretofore the best known computation upper bound for non-trivial attack graphs. A major limitation of the Kansas State attack graph is its analysis capability. No automatic analysis algorithm is provided. Furthermore, for every "what-if" question, a new attack graph must be created. The regeneration requirement and lack of inference capability severely limit the Kansas State attack graph usability in enterprise networks.

Other attack graphs have been developed at the MIT Lincoln Laboratory. These include graphs known as a Full Graph, a Host Compromise Graph, and a Predictive Attack Graph. In general, nodes in these graphs represent hosts, and edges represent vulnerabilities. Generally speaking, these attack graphs represent the hosts and how attackers can reach hosts through vulnerabilities. The different kinds of attack graphs show different semantics and capabilities.

The MIT Full Graph shows all possible paths or sequences of compromised hosts and vulnerabilities that an attacker can use to compromise all hosts in the network. Essentially, the number of nodes in the Full Graph and the computation grow as N!. For example, in a subnet with only 10 hosts, the Full Graph could contain more than 3 million nodes, and one additional host increases the graph size and computation requirements by an order of magnitude. Such factorial complexity clearly reduces the scalability of this type of graph, which we believe makes it unsuitable for practical usage in enterprise networks.

The MIT Host Compromise Graph has edges that represent one of possibly many sequences of vulnerabilities that can lead to a compromise. As a result, the Host Compromise Graph encodes the minimum information for determining the security of enterprise networks, that is, what hosts can be compromised and what privileges can be obtained, regardless of the specific sequence of attack steps. It can be demonstrated that the Host Compromise Graph computation is upper bounded as $O(N^2)$, without a significant loss of semantics. The Host Compromise Graph finds the host that can be compromised and "one" path to achieve the compromise. Such a "one-shot" analysis can be efficient; however, testing any single hypothesis requires regenerating the entire Host Compromise Graph. Therefore, its analytic capability is restricted, which severely limits its power and practicality as a useful tool in enterprise networks. In other words, the Host Compromise Graph is scalable, but not really practical for enterprise networks.

The semantics of the MIT Predictive Attack Graph lies between the Full Graph and Host Compromise Graph. It captures all possible paths of the attack, but omits duplicate paths in the Full Graph by pruning. Essentially, it models the "attack reachability" of a particular network. The computational requirement is somewhere between $O(N^2)$ and $O(N^3)$; however, in some cases, a Predictive Attack Graph can become much larger. As such, its scalability is uncertain, though it does offer some promise. As to analysis capability, the Predictive Attack Graph facilitates automatic static analysis in a fairly efficient manner. The Predictive Attack Graph approach is believed to be the only prior art tool practical for enterprise network security management. However, the Predictive Attack Graph does not support real-time situational awareness or answer predictive "what-if" questions, such as, "What will be the impact on security if I do X and Y, given the current evidence of attacks?" For large-scale enterprise networks, and military networks in particular, such situational awareness and dynamic response capability is extremely important.

Based upon the study of the prior art, it is believed that the semantics of an attack graph can pre-determine several characteristics including representation richness, scalability, and analysis capability. For example, the Carnegie Mellon University attack graph captures all aspects of network states and exploits; however, the attack graph size is often prohibitive, and the poor scalability makes it impractical for enterprise networks. At the other end of the spectrum, if an attack graph only captures what hosts can be compromised, such as the MIT Host Compromise Graph, then weak semantics limit the analysis capability. Therefore, it is an object of the invention to provide an attack graph that provides a balance between extremes.

It is another object of the invention to provide an attack graph for security analysis that provides situational awareness and decision support to the operators, who are users of the attack graph tool. As such, it is a further object of the invention that the application requirements from the operators should play a key role in determining the attack graph semantics. The first information that should be obtained from the users is, "What kinds of questions are important and need to be answered by the attack graph tool?"

It should further be appreciated that given the user application requirements, the actual design of the attack graph is limited by the availability of the informational sources. Such informational sources include, for example, network reachability and vulnerability details. Most of the prior art assumes the availability of network reachability information; however, this assumption creates a significant burden on operators who need to provide such information. Accordingly, it is a further object of the invention to provide a useful tool by automatically computing the reachabillity information in a more accurate and efficient manner.

It is also believed that an attack graph that captures all possible sequences of attacks on all aspects of network resources leads to a state explosion and ruins scalability. Therefore, it is an object of the present invention to alleviate the need for full graphing, which inherently includes extensive redundancy embedded in such full graphs. In full graphs, the same sequence of attacks can appear multiple times. Accordingly, it is an additional object of the invention to reduce and compress redundancy while minimizing a loss of semantics power. As such, a further object of the subject invention is to generate attack graphs with rich semantics that exploit a compressed format for better scalability.

BRIEF SUMMARY OF THE INVENTION

It is a feature of the subject invention to provide a method of generating graphical models for providing security analysis in computer networks that in one embodiment includes the steps of generating a type abstract graph independent of particular networks that models abstract dependency relationships among attributes and exploits; generating network-specific attack graphs by combining the type abstract graph with specific network information to create a network-specific attack graph; monitoring an intruder alert; and generating a real-time attack graph by correlating the intruder alert with the network-specific attack graph. The real-time attack graph can be generated using reachability checking, bridging, and exploit prediction based on consequence of alerts.

The analysis of the real-time attack graph may further include the step of calculating the likelihood of queries using a Bayesian network model. The method may also include the steps of inferring unobserved attacks that may have been missed by intrusion detection sensors, and projecting on which hosts and using what exploits additional intruder attacks may occur. The method may further include the step of comparing alternate actions by computation, wherein the alternate actions include the step of patching some vulnerabilities, and wherein the specific network information includes network topology. The specific network information may also include firewall rules.

The graphs may enable static analysis, situational awareness, prediction of attacks, and action planning to subvert intruder attacks.

The graphs generated by the method include sufficient semantics to provide real-time analysis, yet are scalable for network implementation. The method may further include the steps of mining attack data sets to provide information for the type abstract graph, and providing views, awareness reports and recommendations, wherein one view is network topology. One of the views may be a future view which provides predictions of what might happen next and which hosts are likely targets. The recommendations can include static suggestions such as which hosts are more vulnerable and dynamic recommendations such as given a particular situation, what is the best action to take.

BRIEF DESCRIPTION OF THE DRAWINGS

The above-mentioned and other features and objects of this invention and the manner of obtaining them will become more apparent and the invention itself will be better understood by reference to the following description of embodiments of the present invention taken in conjunction with the accompanying drawings, wherein.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates embodiments of the invention, and such exemplifications are not to be construed as limiting the scope of the invention in any manner.

DETAILED DESCRIPTION OF EMBODIMENTS OF THE INVENTION

For the purposes of promoting an understanding of the principles of the invention, reference will now be made to the embodiments illustrated in the drawings, which are described below. It will nevertheless be understood that no limitation of the scope of the invention is thereby intended. The invention includes any alterations and further modifications in the illustrated devices and described methods and further applications of the principles of the invention, which would normally occur to one skilled in the art to which the invention relates.

Instead of using full-scale attack graphs, such as the Carnegie Mellon University attack graph, or deterministic semantics, the subject invention captures the inherent uncertainties among exploit dependencies to provide compact and scalable attack graph models rich in semantics and efficient in computation. The subject invention goes beyond static analysis of attack graphs (which the system is capable of performing), in order to match current, ongoing scenarios and predict future paths for better situational awareness and security response.

The system provides a separation-and-integration approach to provide a practical and efficient graphical model for cyber security and analysis in enterprise networks. For graphical models at the network level, the problem is divided into three kinds of graphs, namely, a Type Abstract Graph (TAG), a Network Attack Graph (NAG), and a Real-time Attack Graph (RAG). The TAG represents abstract knowledge about the attack structure and is generic by nature. Information in the TAG is combined with network-specific information to create the NAG. When an attack is observed, the RAG is generated for real-time security analysis. The three types of graphs work together to enable static analysis, situational awareness, prediction, and action planning. By separating abstract knowledge from concrete network information, and then combining them later for actual graph generational analysis, the models themselves are a tool that provides wide applicability in enterprise networks. Furthermore, partitioning the graph development effort in this manner also facilitates scalability, which is very important for network-centric enterprises. The integrated graphical TAG, NAG, and RAG models provide automatic situational awareness, damage assessment, and security management. The models are embedded in automated software to aid administrators in normal and attack situations.

Figure 1:
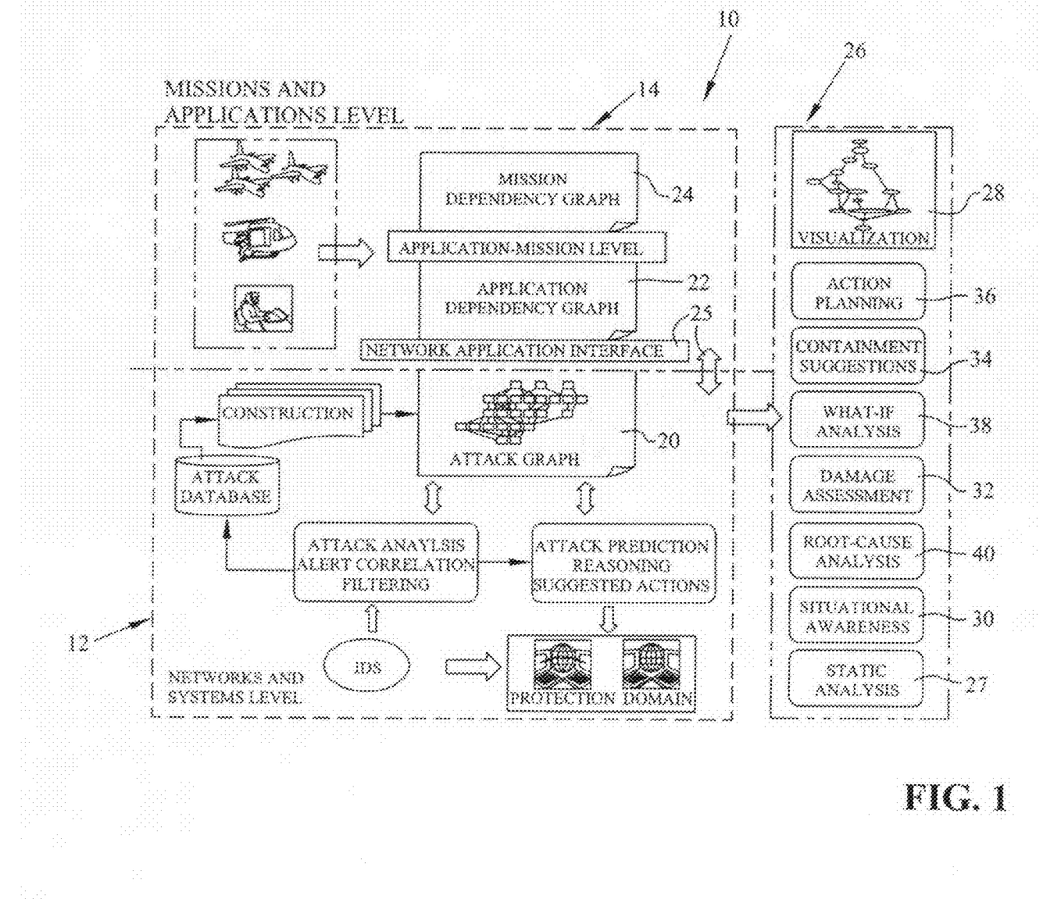
FIG. 1 is a schematic diagram of one embodiment of the architecture of integrated graphical models in accordance with the subject invention.

Now referring to FIG. 1, a schematic diagram of the overall architecture of integrated graphical models in accordance with the subject invention is shown, generally indicated as 10. Architecture 10 includes a lower level, generally indicated as 12, and a higher level, generally indicated as 14. Lower level 12 is focused on network and system security analysis and the development of attack graphs 20. Architecture 10 is discussed in greater detail below in the discussion of FIG. 3, but higher level 14 is focused on application dependency graphs 22 and mission dependency graphs 24 and how these will be affected by cyber attacks on the network system's lower level 12. Graphical models capture the inherent dependency relationship between applications on network systems and missions on the application. Lower level 12 attack graphs 20 and higher level 14 dependency graphs 22 can be viewed as one graph; however, the semantics, construction process and analysis algorithms are different. Therefore, it is believed that it is best not to use a single graphical model to capture the different semantic domains. As such, although the models are separated, interfaces 25 are provided to integrate the different graphical models, and the analysis process is integrated. Outputs from Network Attack Graphs 20 serve as the inputs to the application dependency graph 22 for application damage assessment. The analysis process is automatic and an output, generally indicated as 26, of the software tool includes static analysis 27, user visualizations 28, situational awareness 30, damage assessment reports 32, action recommendations/containment suggestions 34, root cause analysis 40, what-if analysis 38, and action planning 36. It should be noted the importance that situational awareness 30 be provided in real-time in order to make the system effective. The real-time situational awareness is provided in the subject invention using the approach and differentiation of the TAG, NAG, and RAG graphs. The TAG models the abstract exploit scenarios, including the dependency relationship among prerequisites, exploits and effects. The TAG is not specific to any network and can serve as a base for generating network-specific attack graphs. Another base for building network-specific attack graphs is network information and computed network reachability. Combining the source of information, an attack graph can be created that captures both the exploit dependency and the actual network reachability. The derived attack graph is the NAG. Then, when observed evidence, such as alerts, is captured, the RAG can be generated.

The unique differentiation approach of using TAGs, NAGs, and RAGs makes the subject approach widely applicable. It is due to the fact that abstract knowledge captured in the TAG is, by nature, generic. As a result, to apply the tool to a new network, one merely needs to input the specific network information together with the TAG to create a NAG. By separating the abstract knowledge from the concrete network information and then combining them later for actual graph generation and analysis, this allows the subject invention to be used for virtually all enterprise networks. As such, the subject invention bridges the gap from information to intelligence using efficient graphical models. Prior attack graphs provided were either too rich in semantics with lots of redundancy to be scalable or too simplistic to provide a useful and effective analysis. The subject invention provides appropriate balance of the critical trade-off between model richness and scalability.

During evaluation of prior art graphs, observations were noted which were important in the subject invention. One observation being that a cyber attack follows a physical path, wherein attacks can only occur by following the network connectivity and reachability. This is a physical limit for a cyber attack. In addition, the attack structure is such that attacks can only happen by exploiting some vulnerability, wherein pre-conditions enable the attacks and post-conditions are the consequences or effects of the attacks. Careful inspection evaluation revealed that most attack graph models embed the path and attack structure in the graphs, though the graph generation algorithms themselves may not have considered doing so explicitly. Furthermore, while the physical paths are network-specific, the attack structure can be abstract knowledge without encoding any network-specific information, such as a particular host. Therefore, the abstract knowledge can be modeled and managed independent of specific networks. In addition, while current attack graph models only support off-line static analysis, the subject invention goes beyond static analysis and supports dynamic analysis available with the TAG, NAG, and RAG attack-graph approach.

The subject invention utilizes Bayesian networks to capture the uncertainties among exploits and to facilitate security analysis. A Bayesian network is a graphical representation of the cause-and-effect relationship within a problem domain. For any node in a Directed Acyclic Graph, the node is conditionally independent of any other node that is not its descendant. This conditional independence makes Bayesian network models a compact representation of the joint probability distribution over the relevant variables. Bayesian networks can also serve as the inference engine, and can compute efficiently any queries over the variables modeled therein. Bayesian networks are useful in identifying the uncertainty in network attacks and security management.

Figure 2:
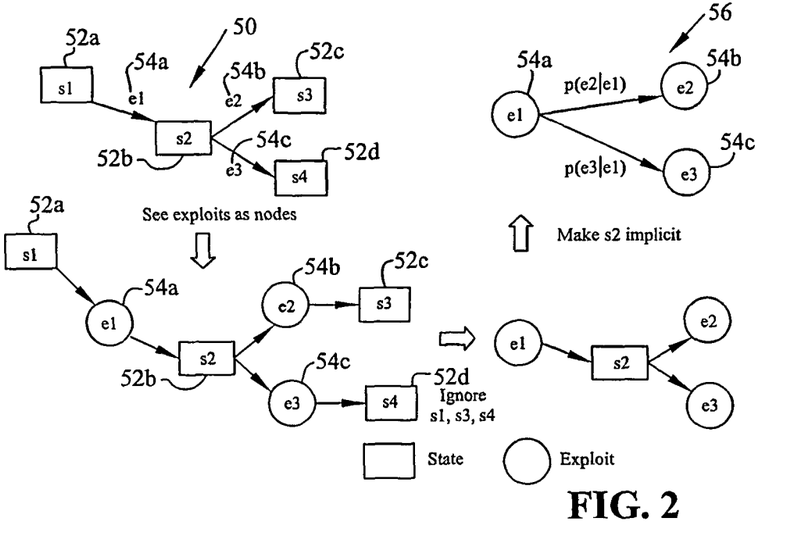
FIG. 2 is a schematic diagram showing dependency relationship among exploits.

The subject invention considers that the dependency relationship among the exploits is, by nature, uncertain. This is demonstrated in FIG. 2, which shows an attack graph fragment, generally indicated as 50, including four states 52a-d and three exploits 54a-c. To examine how previous attack actions/exploits may affect future actions, it can be seen how exploit 54a may lead to exploits 54b and 54c. Accordingly, exploits 54b and 54c depend on exploit 54a. This dependency is represented by the Exploit Dependency Graph, generally indicated as 56, wherein it cannot be determined where exploit 54a will definitely lead. Such uncertainty is represented as conditional probability semantics on the edges of the Exploit Dependency Graph 56, which creates a Bayesian network.

The local dependency structure of exploits is directly related to answering questions regarding attacker intent or strategy. Furthermore, another kind of uncertainty in attack scenarios is that, given a compromised network state, there may be multiple exploits that can lead to this state, and hence it is uncertain which exploit actually happened. Prior art attack graphs fail to capture such structure sufficiently, whereas the Bayesian network model facilitates a rich set of inferences, including diagnosis (e.g., ranking the most likely causes), prediction, and comparison of alternatives (e.g., ranking the alternative actions). It is believed that the subject invention is the first to combine the attack graph and Bayesian network approaches.

Figure 3:
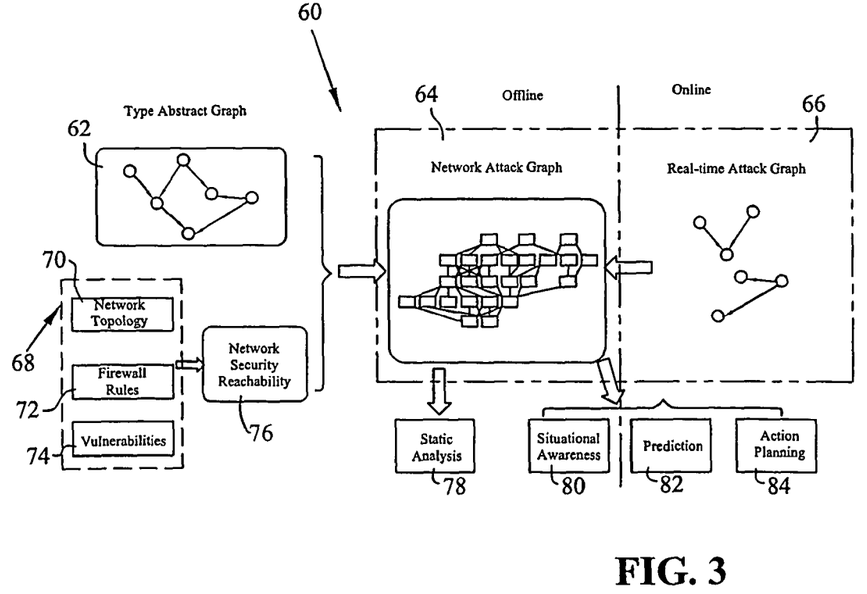
FIG. 3 is a schematic diagram showing architecture on graph models.

Referring now to FIG. 3, a schematic diagram of the architecture on graph models in accordance with the subject invention is generally indicated as 60. As noted, one approach of the subject invention is the definition and development of a TAG 62, a NAG 64, and a RAG 66. The approach of the subject invention integrates real time attack graphs, such as alert correlation graphs, with off-line attack graphs. TAG 62 is independent of any particular network and models the abstract dependency relationship among attributes and exploits. TAG 62 serves as a base for generating NAG 64 in that it provides the attack structure or blueprint of how attacks can happen. However, the TAG itself is not sufficient and must be combined with concrete network information, generally indicated as 68, such as network topology 70, firewall rules 72, and vulnerabilities 74 to create a NAG 64 for a particular network. TAG 62 models can be obtained from either or both domain experts familiar with the particular network or mining attack data sets. It should be appreciated that a TAG can be generated automatically by text mining vulnerabilities and/or an attack database.

With the network information 68, a computed network security reachability 76 can be generated and provides another base for building specific network-specific attack graphs. Essentially, network topology 70 and firewall/router rules 72 determine the physical connectivity among hosts, and TAG 62 determines how compromising one host may lead to the compromise of other hosts via exploits. Accordingly, combining the two sources of information, a NAG 64 can be generated that captures both exploit dependency and actual network reachability 76. NAG 64 is an instance graph as specific host information, rather than just abstract knowledge as contained in TAG 62, is embedded in the graph. NAG 64 is sufficient to execute static analysis 78, and can, for example, answer questions addressed in the MIT attack graphs.

When evidence, such as alerts, is obtained, the evidence is first correlated to form the initial RAG 66 using alert correlation techniques. NAG 64 is used to help the initial RAG 66 extend beyond conventional alert correlation graphs using three extending/refining techniques, including reachability checking, bridging, and exploit prediction using consequence alerts. Furthermore, with the Bayesian network model, the system can calculate the likelihood of various kinds of queries. For example, with observed evidence, the system can infer unobserved attacks that may have been missed by intrusion detection sensors, project what may happen next on which host and with what exploits, and dynamically compare alternate actions, such as patching some of the vulnerabilities 74 using computation rather than actual implementation. Using computation rather than actual implementation has the benefit that computation is generally less expensive than actual actions. This allows the system to provide insightful and timely recommendations to the operator and is especially useful when tackling large-scale networks and addressing complicated situations. In order to be able to infer and plan actions, the underlying model must have a capability for compact representation and efficient inference. The unique combination of the attack graph and Bayesian technologies fulfills such needs.

NAG 64 and RAG 66 can help provide situational awareness 80, prediction 82, and action planning 84. The output of the system includes several kinds of views. One view is the network topology, and the second view is the status-view. For example, some hosts under attack can be illustrated by different colors or flashes. The next view is the future-view, which shows possibilities, and which hosts are the most likely targets. The views can be shown on different displays. An awareness report may contain textual data that can be archived for future analysis, and recommendations can include static suggestions, such as, which hosts are more vulnerable, and dynamic recommendations, such as, given the present situation, what is the best action to take.

The present attack graph invention relies on the observations that: if the relation between any pair of hosts can be captured, then all of the multi-step attacks can be captured through dependence-based reasoning; the basic relation between a pair of hosts H1 and H2 is that the network allows H1 to access H2 through Protocol and Port; and the relation identified between hosts H1 and H2 covers all types of communications between H1 and H2. The relationship between a pair of hosts H1 and H2 is viewed as a fact of network connectivity or reachability.

Given that a state is a predicate associated with a single host identified by a unique IP address, the predicate uses the following variables: port number, program or application name, OS with version numbers, privilege level, access control list (whether compromised or not), the effects of attack, etc. Furthermore, vulnerability is a predicate associated with a single state, and a state typically captures the security aspect of the host's machine status before or after an exploit so that vulnerability is a property of a state. For example, VulSadmind (state X) is a vulnerability at state X. To graph a state's vulnerabilities, a circle is used to represent a state, and if the state has a specific vulnerability, it is represented by a double circle node. If a state has multiple vulnerabilities, then a double circle is used, but it is annotated with a conjunction of several vulnerability predicates. As attack graphs show the effects of attacks exploiting vulnerabilities, most of the nodes in the attack graphs in consideration include double-circled states.

Figure 4:
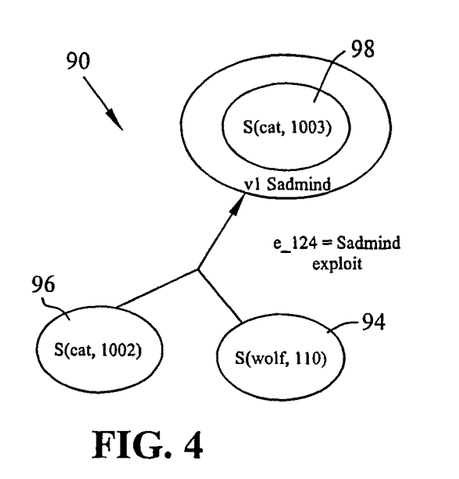
FIG. 4 is a schematic diagram of a remote exploit atomic alert.
Figure 5:
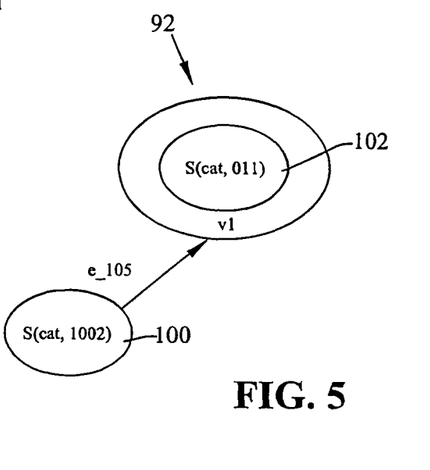
FIG. 5 is a schematic diagram of a local exploit atomic alert.

Regarding alerts and exploits, it is noted that an alert is an event that can be decomposed into a set of atomic alerts that have only two possible types: a remote exploit, generally indicated as 90 in FIG. 4, which involves two hosts H1 and H2, a protocol, and two ports; and a local exploit, generally indicated as 92 in FIG. 5, which causes a state transition on the same host. Accordingly, every alert is an exploit, and an exploit leads to a state transition in the attack graph. As such, each remote exploit will cause a state transition from two states (of H1 and H2, respectively) to a state of H2. In an example of remote exploit 90, shown in FIG. 4, the state transition is from two state nodes {State(110, wolf, attacker, _User) 94, State(1002, cat, Sadmind, port 126, running) 96} to state node state(1003, cat, protocol, port, compromised, attacker has root access) 98. State transition will happen when three conditions are satisfied: (1) host cat runs a vulnerable Sadmind service; (2) the attacker has a user account on host wolf; and (3) the attacker can reach host cat from host wolf. On the other hand, as shown in FIG. 5, local exploit 92 is a transition from one state H1 to another state H1, that is the same host. In the exploit shown in FIG. 5, S (cat, 1002) 100=State (011, cat, attack, _User) 102, v1=VulSunOS (SunOS, v4.1, privilege-escalation-to-root).

It may be uncertain if a host stays in a particular state, as there is inherent uncertainty in the knowledge about the current state of the host. Hence, there is a confidence level with every state to quantify such uncertainty. In some cases, there may be "facts" of which there is 100% certainty, such as the operating system of the host.

Figure 6:
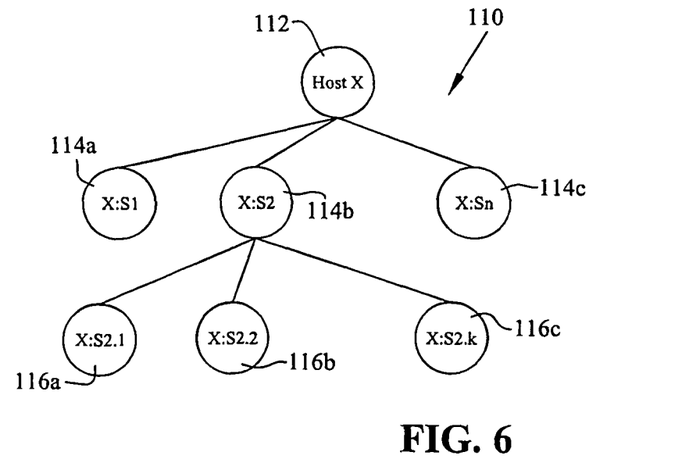
FIG. 6 is a schematic diagram of a state hierarchy.

Now referring to FIG. 6, to achieve scalability, a state hierarchy, generally indicated as 110, is defined. Three layers of the hierarchy states include a host layer 112, a state layer 114a-c, and a vulnerability layer 116a-c. Hierarchical states can be zoomed in or out on, and when zooming out, a characteristic is node aggregation. The fundamental principle that enables node aggregation is the idea of equivalent class, that is, nodes must be found that share common security attributes. Such commonality makes it possible to view nodes as an aggregate. Aggregation at the top level gives rise to an attack graph, such as the MIT attack graph. Richer semantics can be provided to answer more in-depth questions in the subject attack graph, but if the semantics are too rich, then the scalability suffers. Note that when zooming out, details are lost so that a higher level of the attack graph can be observed. The host level provides a good overall view of the attack graph; however, when zooming down in the attack graph, node splitting is observed. This can be done naturally by reversing the aggregation steps.

It should be appreciated that two types of nodes, namely, state nodes, which are represented by a single-circle or a double-circle, and fact nodes, as well as two types of edges, namely, reachability and atomic alerts/exploits, can be sufficient to generate an attack graph in accordance with the subject invention. The following information can be represented by such node and edge definitions: alerts generated by IDS sensors; reports generated by vulnerability scanners; vulnerability reports posted online; reports generated by anti-virus tools; reports generated by integrity checker; firewall rules; access control list; network topology; operating system configurations; service configurations; and reports generated by network management tools. With the node and edge definitions, an attack graph can be generated representing all of the above information sources. This is a scalable representation since each state is only associated with a single host, thereby avoiding state explosion, and reachability edges are used so that only reachable hosts and states are explored.

Figure 7:
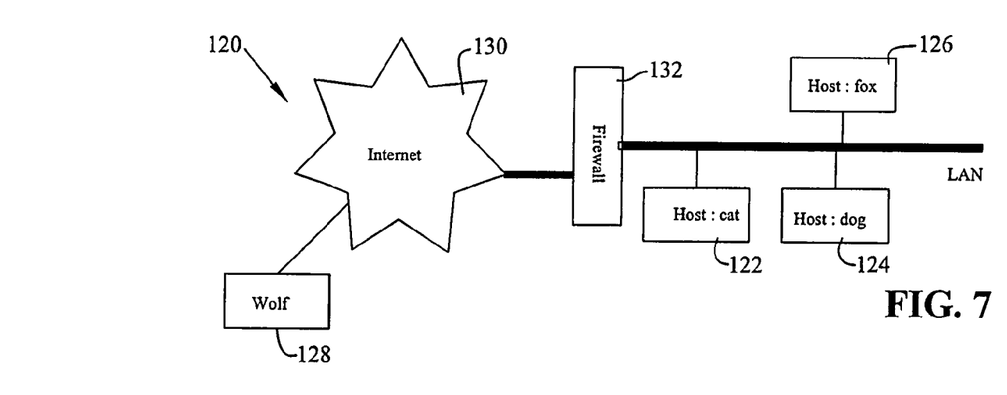
FIG. 7 is a schematic diagram of network topology.

Now referring to FIG. 7, a network topology is shown, generally indicated as 120. In the example shown, the network being protected has three hosts: cat 122, dog 124, and fox 126. Each host has a name and a unique IP address, and any two hosts can talk to each other directly. An attacker wolf 128 proceeds through an interne 130 and a network firewall 132 to attack hosts 122, 124, and 126.

Figure 8:
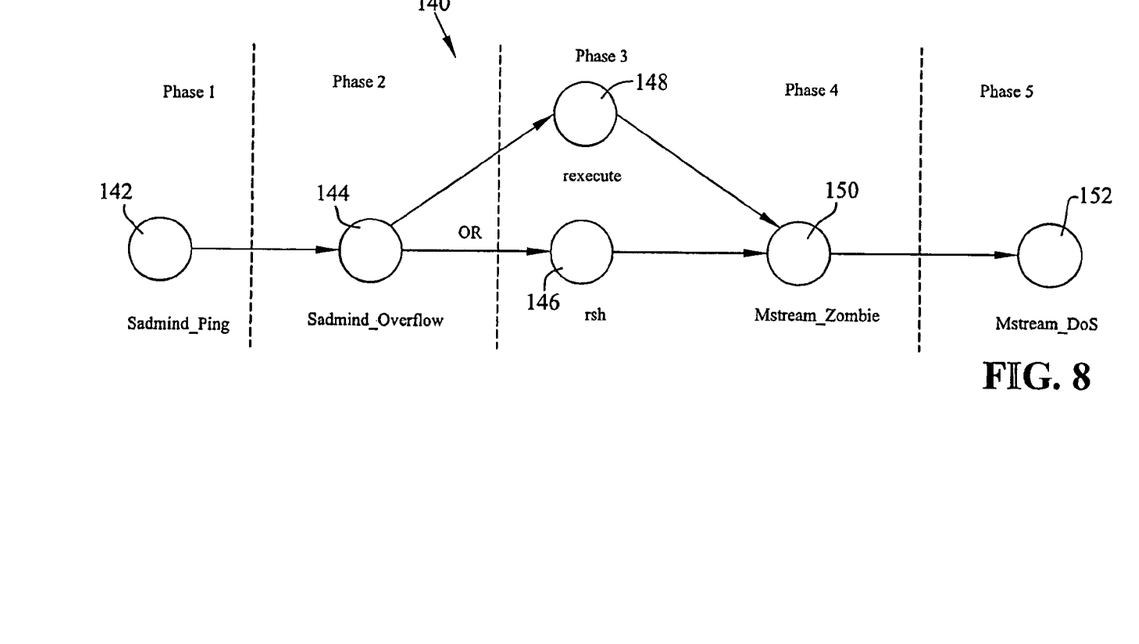
FIG. 8 is a schematic diagram showing an attack.

Referring now to FIG. 8, an attack detail is shown, generally indicated as 140. Mstream DDoS attacks, which are common types of DDoS attacks, have several phases. In phase 1, the attacker uses Sadmind Ping (attacking tools or commands) 142 to discover the vulnerable Sadmind services. In phase 2, the attacker uses Sadmind Overflow 144 to break into the hosts that run these vulnerable Sadmind services. In phase 3, the attacker uses rsh 146 or rexecute 148 to install the mstream daemon/zombie 150 and master programs and the needed backdoors. In phase 4, the attacker uses Mstream DoS 150 to send commands to activate the master programs (via the backdoors). In phase 5, the DDoS master programs communicate with the daemon or zombie programs 152 to ask them to send out a large number of DoS packets.

For phase 1 of the attack, the first hyper-alert indicates that SadmindPing 142 is a type of attack that requires the existence of a host at the VictimIP, and as a result, the attacker may find that this host has a vulnerable Sadmind service. For phase 2 of the attack, the second hyper-alert type indicates that this type of attack requires a vulnerable Sadmind service 144 at the VictimIP, and as a result, the attack may gain root access.

The above type of attack scenario is an example of a scenario where the attack graphs of the subject invention are generated. The TAG can be automatically generated based upon publicly available TAG and vulnerability data sets. A subset of Prolog, called Datalog, is an example of a computer program language that can be used to demonstrate how a NAG can be generated by TAG instantiation using the abstract vulnerability or threat knowledge contained in the TAG and the network topology contained in a network-specific graph. Given a specific network, such as 120 in FIG. 7, reachability, states, facts and vulnerabilities of the corresponding NAG can be specified as a clause in Datalog:

Reachability Clauses: For example, a Reachability rule can be: CanReach (attacker host, cat, protocol, port);

State Clauses: For example, a state of host cat can be one of the following: state(ID, cat, Sadmind, port 126, uncompromised), state(ID, cat, mstream daemon, port 126), state(ID, cat, master program, installed), state(ID, cat, master program, port 300, running), state(ID, cat, compromised, attacker has root access), state(ID, cat, mstream daemon, port 126, the Mstream DoS command received), state(ID, cat, mstream daemon, port 126, DoS packets being sent out);

Vulnerability Clauses: For example, a vulnerability clause can be: VulSadmind(state 1002, Sadmind, port 126, break-in-with-root-privilege).

In contrast, the TAG does not contain any network-specific information, such as host names. Accordingly, variables must be used to represent the TAG. For example, a TAG state clause can be state (Host-1, mstream daemon, port 126), where Host-1 is a variable instead of a concrete host name. Nevertheless, it should be noted that the TAG does contain concrete vulnerability information, such as concrete service/application names and port numbers. Such vulnerability information is not network-specific since the service/application can be run in any network. This unique characteristic separates the subject invention and associated TAG from the exploit rules deployed in at least some of the prior art in which both network information and vulnerability information are represented by variables.

In generating a NAG from a TAG, it should be noted that in Datalog, local exploits and remote exploits are specified as "interaction rules." Within a TAG specification, each interaction rule is an abstract rule using variables. For example, a network-agnostic remote exploit in the TAG can be specified as the following interaction rule:

state(H1, UDP, port 126, compromised, attacker gains root access):—
    CanReach(H2, H1, UDP, port 126),
    State(H2, attacker, _User),
    State(H1, Sadmind, port 126, running),
    VulSadmind(H1, Sadmind, port 126, break-in-with-root-privilege).

When a NAG is generated for network 120, shown in FIG. 7, the TAG can be instantiated by replacing variables H1 and H2 with real host names "cat" and "wolf," respectively. In addition, each instantiated node is assigned an ID number. As a result, the following NAG exploit specification is obtained:

state(1003, cat, UDP, port 126, compromised, attacker gains root access):—
    CanReach(wolf, cat, UDP, port 126),
    State(1001, wolf, attacker, _User),
    State(1002, cat, Sadmind, port 126, running),
    VulSadmind(state 1002, Sadmind, port 126, break-in-with-root-privilege).

In the example attack-defense scenario of FIG. 8, there are eight exploits in concern, and each exploit is associated with a certain vulnerability: Sadmind_Ping 142, Sadmind_overflow 144, rsh 146, rexecute 148, mstream master, mstream daemon 150, backdoor, and mstream_DoS 152. In specifying the algorithms on attack-graph generation and analysis in accordance with the subject invention, it should be remembered that prior art attack graphs stop with static analysis, such as suggesting the weakest hosts in the network, while the subject invention incorporates dynamic analysis to carry out dynamic situational awareness, prediction, and responsive action planning. As such, except for algorithm 1, which is described below, other algorithms are believed to be unique.

As the general idea of generating NAG is to instantiate the blueprint TAG by incorporating network reachability information, the general algorithm is essentially a search process. Abstract knowledge is encoded via Datalog (or other similar computer programming language) interaction rules, and network-specific information is encoded via Datalog (or other similar computer programming language) clauses. A known optimized logic reasoning engine, such as XSB, can be used as the logic analyzer to compute the network states, such as reachability and vulnerability, against the TAG interaction rules. A sketch of the algorithm with the complexity between $O(N^2)$ and $O(N^3)$ is:

Algorithm 1: Offline vulnerability-based NAG generation
Begin
Step 1: specify each vulnerability as a Datalog clause;

Step 2: use information about network topology and firewall rules to generate the reachability clauses;

Step 3: use alerts from IDS sensors and the vulnerability clauses resulted from Step 1 to identify the exploits and specify each of them as an interaction rule;

Step 4: use the package from X. Ou, W. F. Boyer, M. McQueen, "A Scalable Approach to Attack Graph Generation," Proc. 13th ACM Conference on Computer and Communication Security (CCS), 2006, pp. 336-345 (Ou et al.) (which is incorporated herein in its entirety, by reference) to generate the simulation trace of logic analyzer XSB;

Step 5: transform the simulation trace into the graphical representation via leveraging per Ou et al. in the graph building algorithm proposed therein:

Input: set T containing, all the TraceStep terms, attacker's goal $G$

Output: logical attack graph $(N_r, N_p, N_d, E, \mathcal{L}, G)$,

1. $N_r, N_p, N_d, E, \mathcal{L} \leftarrow \emptyset$
2. For each $t \in T$ {
   let t=because(interactionRule, Fact, Conjunct)
3. Create a derivation node r
   $N_r \leftarrow N_r \cup \{r\}$ $\mathcal{L} \leftarrow \mathcal{L} \cup \{r \rightarrow \text{interactionRule}\}$
4. Look up $n \in N_d$ such that $\mathcal{L}(n)$=Fact,
5. If such n does not exist {
   create a new fact node n $\mathcal{L} \leftarrow \mathcal{L} \cup \{n \rightarrow \text{Fact}\} N_d \leftarrow N_d \cup \{n\}$
6. $E \leftarrow E \cup \{(n, r)\}$
7. For each fact f in Conjunct {
8. Look up fact node $c \in (N_p \cup N_d)$ that $\mathcal{L}(c)$=f,
9. If such c does not exist {create a new fact node c
   $\mathcal{L} \leftarrow \mathcal{L} \cup \{c \rightarrow f\}$
   If f is primitive $\{N_p \leftarrow N_p \cup \{c\}\}$ else $\{N_d \leftarrow N_d \cup \{c\}$
   }
10. $E \leftarrow E \cup \{(r, c)\}$
   }
   }
End When a new alert is raised, an Algorithm 2 should be executed to construct a localized, instantiated attack graph. Algorithm 1 will generate a graph similar to that contained in the prior art of the Kansas State University attack graph. Algorithm 2 is unique in that the attack graph is not regenerated whenever a new piece of information is collected; surgery is performed on the attack graph instead of generating a new one; and the graph generation is localized instead of generating a global attack graph.

Then, to generate a RAG, the localization principle and evolution principle are utilized. The localization principle is that each atomic alert is either about a host or pair of hosts so that by nature, all alerts are localized; and the evolution principle is that the attack graphs will evolve or grow in real-time as opposed to being regenerated.

Real-time attack graphs can be generated as follows:
  When the very first (atomic) alert is raised, the graph has nothing; and
    If the first alert is a local exploit, it will add two state nodes and an edge to the empty graph; and the resulted graph will only show one host on the screen; or
    If the first alert is a remote exploit, it will add three state nodes and two edges to the empty graph; and the resulted graph will show two hosts on the screen;
  When another (atomic) alert is raised, the graph can be grown with alert correlation as a by-product during the process; and
    The alert correlation is done naturally as the existing state is reused instead of adding a new state node whenever a state node carried by a new alert is one of the existing states in the graph; and The graph goes beyond conventional alert graphs because of the following:
    If the alert is a remote exploit, the Reachability Table is checked to see if the exploit violates any reachability constraint. If so, a low confidence level is assigned to this exploit indicating that the alert may be a false alert;
    When the new alert is identified as a isolated island on the resulting graph, the offline NAG is searched to determine if there are any potential bridges from the island to the mainland or to other islands. To make the search efficient so that real-time constraints can be satisfied, indices are built against the offline attack graph; and
    If the alert is a consequence alert, new state nodes are added and the offline NAG is searched to connect the new nodes to some existing nodes. During this process, certain exploits may be identified to determine what might have happened that led to the consequence.

The pseudo-code of Algorithm 2 is as follows:
Algorithm 2: Real-time attack graph instantiation algorithm//
Algorithm 2 is specified by deduction: only the first alert and the nth alert need to be processed;

| Input | A is the sequence of alerts raised by the sensors; |
| --- | --- |
| | OG is the offline attack graph generated by Algorithm 1; |
| Output | RG(t) is the real-time attack graph at the current time t; |
| | RG(t) = N(t) union E(t ); E is defined atop N × N |
| 1. | Initialization: RG(t) = { }; |
| 2. | Case the first atomic alert $a_1$ arrives { |
| | If the first alert is a local exploit (S1, S2, e) |
| | N(t) = N(t) union {S1, S2}; |
| | E(t) = E(t) union (S1 → S2); |
| | Otherwise // the alert must be a remote exploit (S1, S2, S3, e) |
| | N(t) = N(t) union {S1, S2, S3}; |
| | E(t) = E(t) union ((S1, S2) → S3); |
| | } |
| 3. | Case the nth atomic alert $a_n$ arrives { |
| 3.1 | If the alert is a local exploit (S1, S2, e) |
| | N(t) = N(t) union {S1, S2}; |
| | E(t) = E(t) union (S1 → S2); |
| 3.2 | Otherwise // the alert must be a remote exploit (S1, S2, S3, e) |
| 3.3 | If Reachability-Check(RT, $a_n$) == True |
| | N(t) = N(t) union {S1, S2, S3}; |
| | E(t) = E(t) union ((S1, S2) → S3); |
| 3.4 | Call Bridging(RG(t), $a_n$, OG); |
| 3.5 | Call Exploit-Predict(RG(t), $a_n$, OG); |
| | } |

Reachability-Check (RT, $a_n$)//A procedure called by Algorithm 2 in step 3.3
  Input
  RT is the Reachability Table;
  $a_n$ is the nth alert raised;
  Output
  True: the Reachability exists
  False: the Reachability exists RG(t)=N(t) union E(t); E is defined atop N×N
  Action If the alert is a remote exploit, we will check the Reachability Table to see if the exploit violates any Reachability constraint. If so, we will assign a low confidence level to this exploit indicating that the alert may be a false alerts;

Bridging (RG(t), $a_n$, OG)//A procedure called by Algorithm 2 in step 3.4
  Input
  RG(t) is the real-time attack graph;
  $a_n$ is the nth alert raised;
  OG is the offline attack graph;

Output
RG(t) with new nodes and edges added;
Action When the new alert turns out to be an isolated island in RG(t), we will search OG to see if there are any potential bridges from the island to the "mainland" or some other islands. To make the search efficient so that the real-time constraints can be satisfied, we must build indices against OG which can be huge.
So we need to develop two component algorithms: the indexing algorithm, and the search algorithm;
If any bridges are found, we will display them in a special color so the security officer can know what may have happened;

Exploit-Predict (RG(t), $a_n$,OG)//A procedure called by Algorithm 2 in step 3.5
Input
RG(t) is the current real-time attack graph;
$a_n$ is the nth alert raised;
OG is the offline attack graph;
Output
RG(t) with some specific new nodes and edges added;
Action If the alert is a consequence alert, we will first add some new state nodes; then we will search OG to "connect" the new nodes to some existing nodes. During this process, certain links (i.e. exploits) may be identified.

In the real-time attack graph analysis, the following capabilities are developed in an Algorithm 3:

Bridges are identified to connect existing nodes with new states and after identifying the bridges, the longer paths within the current graph are identified as a suspicious path. The longer paths are more likely to be a multi-step attack. The suspicious paths are matched against the offline attack graph, and once a matched path is found, the graph is shown on both the suffix and the prefix of the matched path. The suffix identifies what could happen next, while a prefix identifies what has probably happened.

Development of Bayesian situational analysis

As soon as the security operator types in a specific what-if question, the graph is automatically changed in real-time to show the answer. For example, questions may include: What if this firewall rule is added? What if this port is patched in this way? What if port X is closed? What if this reachability is removed by adding this access control rule?

The pseudo-code of the real-time path matching Algorithm 3 is as follows:
PathMatching (RG(t), $P_i$, OG)

| Input | RG(t) is the real-time attack graph; |
| | $P_i$ is a suspicious path identified by the security officer; |
| | OG is the offline attack graph; |
| Output | All the OG paths that match $P_i$, |
| Init. | We index the state nodes inside OG using the relational database indexing method: each type of fields of the set of state nodes inside OG will become a column in the STATE table; |
| | Then we build a set of indices against the following columns: host name, port number, service/program name |
| 1. | Case the first exploit in $P_i$ is a local exploit: $P_i$ will have a single start state node s1 { |
| | x := 0; |
| | We search for state s1 in the STATE table using the indices we have built, and we denote the resulted set of state nodes as S[x]; //S[ ] is an array of sets |
| 1.1 | For each state node s in S[x] { |
| | For each hop h that starts with s in OG{ |
| | If h matches the next hop of $P_i$ |
| | add the resulted state into S[x+1]; |
| | print h; |
| | } |
| | } |

| | x:= x+1 |
| | Jump to step 1.1; |
| | } |
| | Link all the printed hops together, and we will get a set of matched paths denoted P; |
| 2. | Case the first exploit in $P_i$ is a remote exploit, $P_i$ has two starting states: s1 and s2 { |
| | x := 0; |
| | We search for state pair (s1, s2) in the STATE table using the indices we have built, and we denote the resulted set of state pairs as S[x]; |
| 2.1 | For each state s or state pair (s, s') in S[x] { |
| | For each hop h that starts with (s, s') in OG{ |
| | If h matches the next hop of $P_i$ |
| | add the resulted state into S[x+1]; |
| | print h; |
| | } |
| | } |
| | x:= x+1 |
| | Jump to step 2.1; |
| | } |
| | Link all the printed hops together, and we will get a set of matched paths denoted P; |
| 3. | For each path p in P { |
| | Do forward tracking inside OG starting with the last node of p until reaching a sink node { |
| | Print every suffix hop of p; |
| | } |
| | Do backtrack tracking inside OG starting with the first state or state pair of p until reaching a node that has no edges pointed to { |
| | Print every prefix hop of p; |
| | } |
| | } |
| | Link all the suffix hops together; |
| | Link all the prefix hops together; |
| 4. | Start the viz engine to visualize all the matched nodes and hops of OG; |

Based on the above discussions, the pseudo-code of the Interactive What-If Analysis Algorithm (Capability 3) is as follows:

WhatIfAnalysis (RG(t), Q, OG)

| Input | RG(t) is the real-time attack graph; |
| | Q is the what-if question; |
| | OG is the offline attack graph; |
| Output | The answer for question Q; |
| 1. | If Q is a Bayesian what-if analysis question{ |
| | BayesianSituationAwareness (RG(t), Q, $a_n$, OG); |
| | } |
| 2. | Otherwise { |
| | If Q is: what if a firewall rule is added to block (host H, port x) { |
| | Update the Reachability Table accordingly; |
| | Refresh RG(t) as follows { |
| | Search the STATE table of RG(t) for all the state nodes that match (host H, port x); assume the resulted set of nodes is S; |
| | For each state s in S { |
| | If s is the result of a local exploit, do nothing; |
| | If s is the result of any remote exploit(s) |
| | Remove the corresponding edge(s) pointing to s; |
| | Remove node s if it has no edges pointing to itself; |
| | If node s is removed { |
| | Do cascading removing throughout RG(t); |
| | } |
| | } |
| | Start the viz engine to visualize the changed part of RG(t); |
| | If the changed part of RG(t) changes the answer to any existing question Q { |
| | Inform the security officer of the new answer; |
| | } |
| | Refresh OG as follows { |
| | Search the STATE table of OG for all the state nodes that match (host H, port x); assume the resulted set of |

-continued

```
      nodes is S;
      For each state s in S {
          If s is the result of a local exploit, do nothing;
          If s is the result of any remote exploit(s)
              Remove the corresponding edge(s) pointing to s;
              Remove node s if it has no edges pointing to itself;
              If node s is removed {
                  Do cascading removing throughout RG(t);
              }
          }
          Use the removed nodes and edges to refresh the
          knowledge base of OG;
          Rebuild the indices of the STATE table of OG;
      }
      Use the updated OG to re-run the path-patching algorithm;
      If the results are different {
          Show the differences to the security officer;
      }
   }
}
```

With the proceeding algorithms and graphs generated therefrom, applicant has provided a real-time method of separating and integrating graphical models to protect computer networks against intruder attacks. While the invention has been taught with specific reference to these embodiments, one skilled in the art will recognize that changes can be made in form and detail without departing from the spirit and scope of the invention. The described embodiments are to be considered, therefore, in all respects only as illustrative and not restrictive. As such, the scope of the invention is indicated by the following claims rather than by the description.

The invention claimed is:

1. A method of generating graphical models for providing security analysis in computer networks including the steps of:
    providing an enterprise computer network;
    generating a type abstract graph independent of said particular network that models abstract dependency relationships among attributes and exploits using a software tool;
    generating a network-specific attack graph by combining said type abstract graph with specific information regarding said network using the software tool;
    monitoring an intruder alert; and
    generating a real-time attack graph of the network by correlating the intruder alert with said network-specific attack graph using the software tool.

2. The method for generating graphical models for providing security analysis in computer networks as set forth in claim 1, wherein said real-time attack graph is generated using reachability checking, bridging, and exploit prediction based on consequence of alerts and wherein a new attack graph is not regenerated when new information is collected, but is changed locally.

3. The method for generating graphical models for providing security analysis in computer networks as set forth in claim 2, including the step of calculating the likelihood of queries.

4. The method for generating graphical models for providing security analysis in computer networks as set forth in claim 2, wherein the likelihood of queries is calculated using a Bayesian network model.

5. The method for generating graphical models for providing security analysis in computer networks as set forth in claim 4, further including the step of inferring unobserved attacks that may have been missed by intrusion detection sensors.

6. The method for generating graphical models for providing security analysis in computer networks as set forth in claim 1, wherein the network includes hosts and further including the step of projecting on which hosts and using what exploits additional intruder attacks may occur.

7. The method for generating graphical models for providing security analysis in computer networks as set forth in claim 6, further including the step of comparing alternate actions by computation.

8. The method for generating graphical models for providing security analysis in computer networks as set forth in claim 7, wherein the alternate actions include the step of patching some vulnerabilities.

9. The method for generating graphical models for providing security analysis in computer networks as set forth in claim 1, wherein said specific network information includes network topology.

10. The method for generating graphical models for providing security analysis in computer networks as set forth in claim 1, wherein said specific network information includes firewall rules.

11. The method for generating graphical models for providing security analysis in computer networks as set forth in claim 1, wherein said graphs enable static analysis.

12. The method for generating graphical models for providing security analysis in computer networks as set forth in claim 1, wherein said graphs enable situational awareness.

13. The method for generating graphical models for providing security analysis in computer networks as set forth in claim 1, wherein said graphs enable prediction of attacks.

14. The method for generating graphical models for providing security analysis in computer networks as set forth in claim 1, wherein said graphs enable action planning to subvert intruder attacks.

15. The method for generating graphical models for providing security analysis in computer networks as set forth in claim 1, wherein said graphs include sufficient semantics to provide real-time analysis, yet are scalable for network implementation.

16. The method for generating graphical models for providing security analysis in computer networks as set forth in claim 1, further including the step of mining attack data sets to provide information for said type abstract graph.

17. The method for generating graphical models for providing security analysis in computer networks as set forth in claim 1, including the step of providing views, awareness reports and recommendations.

18. The method for generating graphical models for providing security analysis in computer networks as set forth in claim 17, wherein one view is network topology.

19. The method for generating graphical models for providing security analysis in computer networks as set forth in claim 18, further including a future view which provides predictions of what might happen next and which hosts are likely targets.

20. The method for generating graphical models for providing security analysis in computer networks as set forth in claim 17, wherein the recommendations include static suggestions such as, which hosts are more vulnerable and dynamic recommendations such as given a particular situation, what is the best action to take.

21. The method for generating graphical models for providing security analysis in computer networks as set forth in claim 1, including the step of adding two state nodes and an edge to an empty graph when a first alert being a local exploit is raised.

22. The method for generating graphical models for providing security analysis in computer networks as set forth in claim 21, wherein the resulting graph will only show one host on the screen.

23. The method for generating graphical models for providing security analysis in computer networks as set forth in claim 1, including the step of adding three state nodes and two edges to the graph when a first alert is raised being a remote exploit.

24. The method for generating graphical models for providing security analysis in computer networks as set forth in claim 23, wherein the resulting graph will show two hosts on the screen.

25. The method for generating graphical models for providing security analysis in computer networks as set forth in either claim 21 or claim 23, including the step of growing the graph when another alert is raised by reusing the existing state.

26. The method for generating graphical models for providing security analysis in computer networks as set forth in claim 25, wherein if the alert is a remote exploit, a reachability table is checked to determine if the exploit violates any reachability constraint, and if so, a low confidence level is assigned to the exploit indicating that the alert may be a false alert.

27. The method for generating graphical models for providing security analysis in computer networks as set forth in claim 25, wherein if a new alert is identified as an isolated island on the resulting graph, the network-specific attack graph is searched to determine if there is a potential bridge from the island to the mainland or to other islands.

28. The method for generating graphical models for providing security analysis in computer networks as set forth in claim 25, wherein if the alert is a consequence alert, new state nodes are added and the network-specific attack graph is searched to connect the new nodes to some existing nodes.

29. The method for generating graphical models for providing security analysis in computer networks as set forth in claim 28, further including the step of identifying bridges to connect the existing nodes with new states and after identifying the bridges, longer paths within the current graph are identified as a suspicious path.

30. The method for generating graphical models for providing security analysis in computer networks as set forth in claim 29, wherein longer paths are more likely to be a multiple-step attack, and further including the step of matching suspicious paths against the network-specific attack graph.

31. The method for generating graphical models for providing security analysis in computer networks as set forth in claim 30, wherein when a matched path is found, a graph is shown on both the suffix and prefix of the matched path wherein a suffix identifies what could happen next and a prefix identifies what has probably happened.

32. The method for generating graphical models for providing security analysis in computer networks as set forth in claim 1, including the steps of an operator typing in a specific what-if question and the graph automatically changing to the real-time attack graph to show the answer.

33. A system for generating graphical models for providing security analysis in computer networks comprising:
an enterprise computer network;
a type abstract graph independent of said particular network that models abstract dependency relationships among attributes and exploits generated by a software tool; and
a network-specific attack graph of said network based on said type abstract graph generated by a software tool, wherein the network-specific graph is at least partly defined by a reachability clause, a state clause of one or more hosts and a vulnerability clause.

34. The system for generating graphical models for providing security analysis in computer networks as set forth in claim 33, wherein specific information about said network is combined with said type abstract graph to generate said network-specific attack graph.

35. The system for generating graphical models for providing security analysis in computer networks as set forth in claim 33, wherein the system monitors for an intruder alert.

36. The system for generating graphical models for providing security analysis in computer networks as set forth in claim 35, wherein the system generates a real-time attack graph by correlating the intruder alert with said network-specific attack graph.

37. The system for generating graphical models for providing security analysis in computer networks as set forth in claim 33, wherein said specific network information includes network topology.

38. The system for generating graphical models for providing security analysis in computer networks as set forth in claim 33, wherein said specific network information includes firewall rules.

39. The system for generating graphical models for providing security analysis in computer networks as set forth in claim 33, wherein said graphs enable static analysis.

40. The system for generating graphical models for providing security analysis in computer networks as set forth in claim 33, wherein said graphs enable situational awareness.

41. The system for generating graphical models for providing security analysis in computer networks as set forth in claim 33, wherein said graphs enable prediction of attacks.

42. The system for generating graphical models for providing security analysis in computer networks as set forth in claim 33, wherein said graphs also enable action planning to subvert intruder attacks.

43. The system for generating graphical models for providing security analysis in computer networks as set forth in claim 35, wherein the software tool process includes:

| | |
|---|---|
| Input | A is the sequence of alerts raised by the sensors; |
| | OG is the offline attack graph generated by Algorithm 1; |
| Output | RG(t) is the real-time attack graph at the current time t; |
| | RG(t) = N(t) union E(t); E is defined atop N × N |
| 1. | Initialization: RG(t) = { }; |
| 2. | Case the first atomic alert $a_r$ arrives { |
| |    If the first alert is a local exploit (S1, S2, e) |
| |       N(t) = N(t) union {S1, S2}; |
| |       E(t) = E(t) union (S1 → S2); |
| |    Otherwise // the alert must be a remote exploit (S1, S2, S3, e) |
| |       N(t) = N(t) union {S1, S2, S3}; |
| |       E(t) = E(t) union ((S1, S2) → S3); |
| | } |
| 3. | Case the nth atomic alert $a_n$ arrives { |
| 3.1 | If the alert is a local exploit (S1, S2, e) |
| |    N(t) = N(t) union {S1, S2}; |
| |    E(t) = E(t) union (S1 → S2); |
| 3.2 | Otherwise // the alert must be a remote exploit (S1, S2, S3, e) |
| 3.3 | If Reachability-Check(RT, $a_n$) == True |
| |    N(t) = N(t) union {S1, S2, S3}; |
| |    E(t) = E(t) union ((S1, S2) → S3); |
| 3.4 | Call Bridging(RG(t), $a_n$, OG); |
| 3.5 | Call Exploit-Predict(RG(t), $a_n$, OG); |
| | } |

Reachability-Check (RT, $a_n$) II A procedure called by Algorithm 2 in step 3.3
Input
  RT is the Reachability Table;
  $a_n$ is the nth alert raised;
Output
  True: the Reachability exists
  False: the Reachability exists RG(t)=N(t) union E(t); E is defined atop N×N
Action If the alert is a remote exploit, we will check the Reachability Table to see if the exploit violates any Reachability constraint. If so, we will assign a low confidence level to this exploit indicating that the alert may be a false alerts;
Bridging (RG(t), $a_n$,OG)//A procedure called by Algorithm 2 in step 3.4
Input
  RG(t) is the real-time attack graph;
  $a_n$ is the nth alert raised;
  OG is the offline attack graph;
Output
  RG(t) with new nodes and edges added;
Action When the new alert turns out to be an isolated island in RG(t), we will search OG to see if there are any potential bridges from the island to the "mainland" or some other islands. To make the search efficient so that the real-time constraints can be satisfied, we must build indices against OG which can be huge.
  So we need to develop two component algorithms: the indexing algorithm, and the search algorithm;
  If any bridges are found, we will display them in a special color so the security officer can know what may have happened;
Exploit-Predict (RG(t), $a_n$,OG)//A procedure called by Algorithm 2 in step 3.5
Input
  RG(t) is the current real-time attack graph;
  $a_n$ is the nth alert raised;
  OG is the offline attack graph;
Output
  RG(t) with some specific new nodes and edges added;
Action If the alert is a consequence alert, we will first add some new state nodes; then we will search OG to "connect" the new nodes to some existing nodes. During this process, certain links (i.e. exploits) may be identified.

44. The system for generating graphical models for providing security analysis in computer networks as set forth in claim 35, wherein the software tool process includes:

| | |
|---|---|
| Input | RG(t) is the real-time attack graph; |
| | $P_i$ is a suspicious path identified by the security officer; |
| | OG is the offline attack graph; |
| Output | All the OG paths that match $P_i$; |
| Init. | We index the state nodes inside OG using the relational database indexing method: each type of fields of the set of state nodes inside OG will become a column in the STATE table; |
| | Then we build a set of indices against the following columns: host name, port number, service/program name |
| 1. | Case the first exploit in $P_i$ is a local exploit: $P_i$ will have a single start state node s1 { |
| | x := 0; |
| | We search for state s1 in the STATE table using the indices we have built, and we denote the resulted set of state nodes as S[x]; //S[ ] is an array of sets |
| 1.1 | For each state node s in S[x] { |
| | For each hop h that starts with s in OG{ |
| | If h matches the next hop of $P_i$ |
| | add the resulted state into S[x+1]; |
| | print h; |
| | } |
| | } |
| | x:= x+1 |
| | Jump to step 1.1; |
| | } |
| | Link all the printed hops together, and we will get a set of matched paths denoted P; |
| 2. | Case the first exploit in $P_i$ is a remote exploit, $P_i$ has two starting states: s1 and s2 { |
| | x := 0; |
| | We search for state pair (s1, s2) in the STATE table using the indices we have built, and we denote the resulted set of state pairs as S[x]; |
| 2.1 | For each state s or state pair (s, s') in S[x] { |
| | For each hop h that starts with (s, s') in OG{ |
| | If h matches the next hop of $P_i$ |
| | add the resulted state into S[x+1]; |
| | print h; |
| | } |
| | } |
| | x:= x+1 |
| | Jump to step 2.1; |
| | } |
| | Link all the printed hops together, and we will get a set of matched paths denoted P; |
| 3. | For each path p in P { |
| | Do forward tracking inside OG starting with the last node of p until reaching a sink node { |
| | Print every suffix hop of p; |
| | } |
| | Do backtrack tracking inside OG starting with the first state or state pair of p until reaching a node that has no edges pointed to { |
| | Print every prefix hop of p; |
| | } |
| | } |
| | Link all the suffix hops together; |
| | Link all the prefix hops together; |
| 4. | Start the viz engine to visualize all the matched nodes and hops of OG; |

Based on the above discussions, the pseudo-code of the Interactive What-If Analysis Algorithm (Capability 3) is as follows:
  WhatIfAnalysis (RG(t), Q, OG)

| | |
|---|---|
| Input | RG(t) is the real-time attack graph; |
| | Q is the what-if question; |
| | OG is the offline attack graph; |
| Output | The answer for question Q; |
| 1. | If Q is a Bayesian what-if analysis question{ |
| | BayesianSituationAwareness (RG(t), Q, $a_n$, OG); |
| | } |
| 2. | Otherwise { |
| | If Q is: what if a firewall rule is added to block (host H, port x) { |
| | Update the Reachability Table accordingly; |
| | Refresh RG(t) as follows { |
| | Search the STATE table of RG(t) for all the state nodes that match (host H, port x); |
| | assume the resulted set of nodes is S; |
| | For each state s in S { |
| | If s is the result of a local exploit, do nothing; |
| | If s is the result of any remote exploit(s) |
| | Remove the corresponding edge(s) pointing to s; |
| | Remove node s if it has no edges pointing to itself; |
| | If node s is removed { |
| | Do cascading removing throughout RG(t); |
| | } |
| | } |
| | Start the viz engine to visualize the changed part of RG(t); |
| | If the changed part of RG(t) changes the answer to |

```
            any existing question Q {
                Inform the security officer of the new answer;
            }
            Refresh OG as follows {
                Search the STATE table of OG for all the
                state nodes that match (host H, port x);
                assume the resulted set of nodes is S;
                For each state s in S {
                    If s is the result of a local exploit, do nothing;
                    If s is the result of any remote exploit(s)
                        Remove the corresponding edge(s) pointing to s;
                    Remove node s if it has no edges pointing to itself;
                    If node s is removed {
                        Do cascading removing throughout RG(t);
                    }
                }
                Use the removed nodes and edges to refresh
                the knowledge base of OG;
                Rebuild the indices of the STATE table of OG;
            }
            Use the updated OG to re-run the path-patching algorithm;
            If the results are different {
                Show the differences to the security officer;
            }
        }
    }
}
```

\* \* \* \* \*